US011852614B2

United States Patent
Matsuura

(10) Patent No.: US 11,852,614 B2
(45) Date of Patent: Dec. 26, 2023

(54) MATERIAL TESTING MACHINE AND METHOD OF CONTROLLING MATERIAL TESTING MACHINE

(71) Applicant: SHIMADZU CORPORATION, Kyoto (JP)

(72) Inventor: Tohru Matsuura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 434 days.

(21) Appl. No.: 17/297,455

(22) PCT Filed: Jun. 10, 2019

(86) PCT No.: PCT/JP2019/022931
§ 371 (c)(1),
(2) Date: May 26, 2021

(87) PCT Pub. No.: WO2020/110354
PCT Pub. Date: Jun. 4, 2020

(65) Prior Publication Data
US 2022/0034775 A1    Feb. 3, 2022

(30) Foreign Application Priority Data

Nov. 28, 2018    (JP) .................. 2018-221910

(51) Int. Cl.
*G01N 3/30*    (2006.01)
*G01N 3/08*    (2006.01)
(Continued)

(52) U.S. Cl.
CPC .............. *G01N 3/08* (2013.01); *G01N 3/30* (2013.01); *G05B 5/01* (2013.01); *G05B 13/0205* (2013.01);
(Continued)

(58) Field of Classification Search
CPC .... G01N 3/08; G01N 3/30; G01N 2203/0017; G01N 2203/0218; G01N 2203/0208;
(Continued)

(56) References Cited

U.S. PATENT DOCUMENTS

| | | | | |
|---|---|---|---|---|
| 2,996,670 | A | * | 8/1961 | Simonton ................ G05B 5/01 324/99 R |
| 2002/0040284 | A1 | * | 4/2002 | Junk .................. G05B 23/0229 702/189 |
| 2004/0153196 | A1 | | 8/2004 | Park et al. |
| 2019/0187195 | A1 | | 6/2019 | Matsuura |
| 2020/0266659 | A1 | * | 8/2020 | Ueda ................. H02J 13/00006 |

FOREIGN PATENT DOCUMENTS

| | | |
|---|---|---|
| JP | H04274725 | 9/1992 |
| JP | H10105201 | 4/1998 |

(Continued)

OTHER PUBLICATIONS

Machine translation of JP-2008164463 merged with original foreign reference (Year: 2008).*

(Continued)

*Primary Examiner* — David J Bolduc
(74) *Attorney, Agent, or Firm* — JCIPRNET

(57) ABSTRACT

Provided is a material testing machine (1) including: a load mechanism (12) that applies a load to a test object; a load measurement device that measures the load applied to the test object; and a control device (30) that performs a feedback control for the load mechanism (12) based on a deviation between a measurement value of the load and a target value of the load, in which a change in a physical quantity generated in the test object due to the load is measured, and the control device (30) includes a hunting detection unit (66) that detects hunting by comparing a frequency spectrum obtained by converting time-series data (Continued)

of the measurement value with a frequency spectrum obtained by converting the time-series data of the target value.

11 Claims, 12 Drawing Sheets

(51) Int. Cl.
*G05B 5/01* (2006.01)
*G05B 13/02* (2006.01)
(52) U.S. Cl.
CPC ............... *G01N 2203/0017* (2013.01); *G01N 2203/0218* (2013.01)
(58) Field of Classification Search
CPC .... G01N 3/06; G01N 3/16; G01N 2203/0212; G01N 2203/0676; G01N 3/20; G05B 5/01; G05B 13/0205
See application file for complete search history.

(56) References Cited

FOREIGN PATENT DOCUMENTS

| JP | 2000320383 | | 11/2000 |
|----|------------|---|---------|
| JP | 2004167604 | | 6/2004 |
| JP | 2008164463 A | * | 7/2008 |
| JP | 2013145692 | | 7/2013 |
| JP | 2013221430 | | 10/2013 |
| JP | 2019109189 | | 7/2019 |

OTHER PUBLICATIONS

"International Search Report (Form PCT/ISA/210) of PCT/JP2019/022931", dated Aug. 27, 2019, with English translation thereof, pp. 1-4.

"Written Opinion of the International Searching Authourity (Form/ISA/237) of PCT/JP2019/022931", dated Aug. 27, 2019, with partial English translation thereof, pp. 1-4.

* cited by examiner

MATERIAL TESTING MACHINE AND METHOD OF CONTROLLING MATERIAL TESTING MACHINE

CROSS-REFERENCE TO RELATED APPLICATION

This application is a 371 application of the International PCT application serial no. PCT/JP2019/022931, filed on Jun. 10, 2019, which claims the priority benefits of Japan Patent Application No. 2018-221910, filed on Nov. 28, 2018. The entirety of each of the above-mentioned patent applications is hereby incorporated by reference herein and made a part of this specification.

TECHNICAL FIELD

The present invention relates to a material testing machine and a method of controlling a material testing machine.

BACKGROUND ART

Various testing machines such as a tensile testing machine, a hardness testing machine, and a fatigue testing machine are known as a material testing machine that performs a material test for investigating mechanical characteristics and mechanical properties of a material.

A material testing machine generally includes a load mechanism that applies a testing force as a load to a test object, a control device that controls the load mechanism, a testing force measurement device that measures the testing force applied to a test piece, and a physical quantity measurement device that measures a change in a predetermined physical quantity generated in the test piece. During the material test, the control device performs a feedback control for the load mechanism based on a deviation between a measurement value of the testing force or a measurement value of a physical quantity conversion generated in the test piece and a target value thereof in order to make the measurement value follow the target value or a target speed, which changes from moment to moment. In the feedback control, a phenomenon in which a control target value such as a measurement value of the testing force oscillates, so-called hunting, may occur due to various factors.

The following methods of detecting hunting are known as below. That is, the methods are a method of detecting hunting based on an amplitude in time-series data of a hunting detection target signal (see, for example, Patent Literature 1, Patent Literature 2, and Patent Literature 3) and a method of performing an FFT analysis of time-series data of a hunting detection target signal to detect hunting (see, for example, Patent Literature 4 and Patent Literature 5).

CITATION LIST

Patent Literature

Patent Literature 1: JP 2013-221430 A
Patent Literature 2: JP 2000-320383 A
Patent Literature 3: JP H10-105201 A
Patent Literature 4: JP 2013-145692 A
Patent Literature 5: H04-274725 A

SUMMARY

Technical Problem

However, when time-series data which is a target value changes on a time axis, it is difficult to accurately detect hunting from a hunting detection target signal.

An object of the present invention is to provide a material testing machine that can accurately detect hunting and a method of controlling a material testing machine.

Solution to Problem

This specification includes all the contents of Japanese Patent Application No. 2018-221910 filed on Nov. 28, 2018.

According to a first invention, there is provided a material testing machine including: a load mechanism that applies a load to a test object; a load measurement device that measures the load applied to the test object; and a control device that performs a feedback control for the load mechanism based on a deviation between a measurement value of the load and a target value of the load, in which a change in a physical quantity generated in the test object due to the load is measured, and the control device includes a hunting detection unit that detects hunting by comparing a frequency spectrum obtained by converting time-series data of the measurement value with a frequency spectrum obtained by converting time-series data of the target value, or by comparing a frequency spectrum obtained by converting time-series data of a command value of the feedback control with the frequency spectrum obtained by converting the time-series data of the target value.

According to a second invention, in the first invention, an influence of noise of a control system in the feedback control and/or noise of a measurement system measuring the load and the physical quantity is removed from the measurement value and the frequency spectrum of the measurement value is compared with the frequency spectrum of the target value, or an influence of noise of the control system in the feedback control is removed from the command value of the feedback control and the frequency spectrum of the command value is compared with the frequency spectrum of the target value.

According to a third invention, in the second invention, the hunting detection unit compares the frequency spectrum of the measurement value with the frequency spectrum of the target value in a state in which a frequency spectrum of noise obtained by measuring the noise of the control system in the feedback control and/or the noise of the measurement system measuring the load and the physical quantity is removed from the frequency spectrum of the measurement value, or compares the frequency spectrum of the command value with the frequency spectrum of the target value in a state in which a frequency spectrum of noise obtained by measuring the noise of the control system in the feedback control is removed from the frequency spectrum of the command value of the feedback control.

According to a fourth invention, in the second invention, the hunting detection unit compares the frequency spectrum of the measurement value with the frequency spectrum of the target value, or the frequency spectrum of the command value of the feedback control with the frequency spectrum of the target value, in a frequency domain excluding a low frequency domain without a frequency of the hunting.

According to a fifth invention, in the second invention or the fourth invention, the hunting detection unit compares the frequency spectrum of the measurement value with the frequency spectrum of the target value, or the frequency spectrum of the command value of the feedback control with the frequency spectrum of the target value, in a frequency domain excluding a high frequency domain including the noise of the control system in the feedback control.

According to a sixth invention, in the fifth invention, a dither signal is added to a command signal of the command value of the feedback control by the control system in the feedback control, and the hunting detection unit performs the comparison in a frequency domain in which a high frequency domain including the dither signal is removed from the frequency spectrum of the measurement value when the frequency spectrum of the measurement value is compared with the frequency spectrum of the target value.

According to a seventh invention, in the fifth invention, the hunting detection unit compares the frequency spectrum of the measurement value with the frequency spectrum of the target value, or the frequency spectrum of the command value of the feedback control with the frequency spectrum of the target value, in a predetermined frequency domain that is guaranteed not to include the noise.

According to an eighth invention, in any one of the first invention to seventh invention, the hunting detection unit determines whether or not the hunting occurs based on whether or not a cumulative value of an amplitude in the frequency spectrum of the measurement value or the frequency spectrum of the command value is a predetermined value or more, compared with a cumulative value of an amplitude in the frequency spectrum of the target value.

According to a ninth invention, in any one of the first invention to the eighth invention, the frequency spectrum of the measurement value or the command value, and the frequency spectrum of the target value are obtained by converting data for a predetermined time, which are cut out from the time-series data of the measurement value or the command value, and the time-series data of the target value, and the predetermined time is set based on a cycle of a feedback control cycle in the feedback control.

According to a tenth invention, in any one of the first invention to the ninth invention, a hunting countermeasure processing unit is further provided, the hunting countermeasure processing unit suppressing the hunting by changing a control parameter of a control system in the feedback control when the hunting is detected.

According to an eleventh invention, there is provided a method of controlling a material testing machine including: a load mechanism that applies a load to a test object; a load measurement device that measures the load applied to the test object; and a control device that performs a feedback control for the load mechanism based on a deviation between a measurement value of the load and a target value of the load, the material testing machine measuring a change in a physical quantity generated in the test object due to the load. The method includes causing the control device to detect hunting by comparing a frequency spectrum obtained by converting time-series data of the measurement value with a frequency spectrum obtained by converting time-series data of the target value, or by comparing a frequency spectrum obtained by converting time-series data of a command value of the feedback control with the frequency spectrum obtained by converting the time-series data of the target value.

Advantageous Effects of Invention

According to the first invention, the hunting can be detected accurately even when a time waveform of the target value of the load fluctuates.

According to the second invention, accuracy of hunting detection is improved since an influence of noise of the control system in the feedback control and/or noise of the measurement system is removed and the comparison is performed.

According to the third invention, since the frequency spectrum of the noise obtained by measuring the noise of the control system in the feedback control and/or the noise of the measurement system is removed from the frequency spectrum of the measurement value, an influence of the actually measured noise can be reliably removed.

According to the fourth to seventh inventions, even when the noise of the control system in the feedback control and/or the noise of the measurement system is not measured, the hunting can be detected without being affected by the noise in the low frequency domain.

According to the eighth invention, it can be detected that the hunting occurs in a scale in which a difference between the cumulative value of the amplitude in the frequency spectrum of the measurement value and the cumulative value of the amplitude in the frequency spectrum of the target value is a predetermined value or more.

According to the ninth invention, even when the time-axis waveform of the target value includes a vibration component, the predetermined time is appropriately set between one cycle and a plurality of cycles of the feedback control cycle according to the vibration state. Therefore, the hunting can be detected with a reasonable detection accuracy and a detection speed.

According to the tenth invention, since the detected hunting is suppressed, it is possible to prevent a decrease in accuracy of the material test.

According to the eleventh invention, the same effect as that of the first invention is obtained.

DESCRIPTION OF THE EMBODIMENTS

Hereinafter, the embodiment of the present invention will be described with reference to the drawings.

Figure 1:
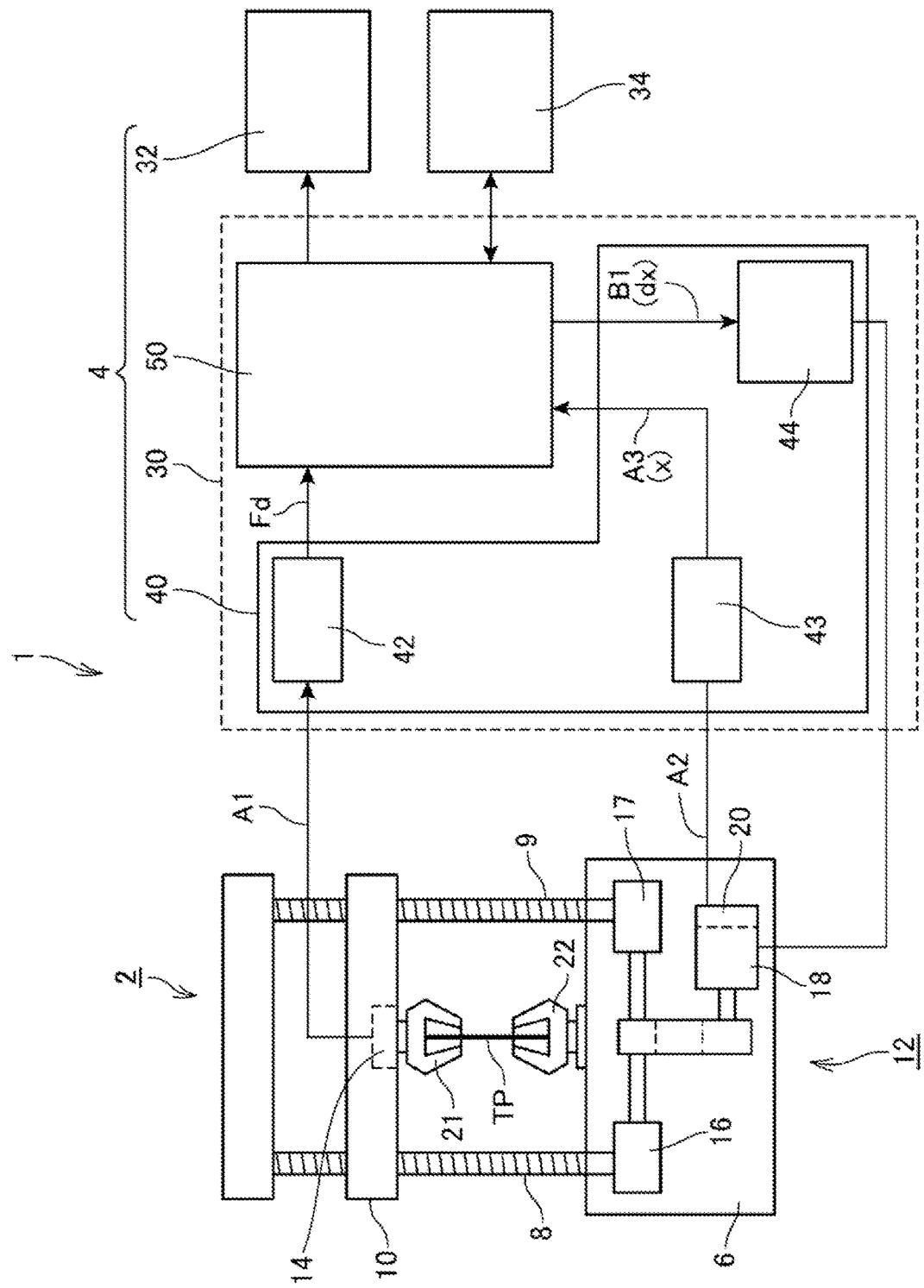
FIG. 1 is a diagram schematically illustrating a configuration of a material testing machine according to an embodiment of the present invention.

FIG. 1 is a diagram schematically illustrating a configuration of a material testing machine 1 according to the embodiment.

The material testing machine 1 of the embodiment is a so-called universal testing machine that can performs a tensile test, a compression test, and a bending test. The material testing machine 1 includes a testing machine main body 2 that applies a load to a test piece TP, which is a test object, to perform a material test, and a control unit 4 that controls the material test operation performed by the testing machine main body 2. The test objects are various materials, industrial products, parts or members of the industrial products, and the like, and the test piece TP is prepared for the material test based on a predetermined standard.

The testing machine main body 2 includes a table 6, a pair of screw rods 8 and 9 rotatably erected on the table 6 in a vertical direction, a crosshead 10 that can move along the screw rods 8 and 9, a load mechanism 12 that applies a load to the test piece TP by moving the crosshead 10, and a load cell 14. The load cell 14 is a sensor that measures a testing force F, which is a load applied to the test piece TP, and outputs a testing force measurement signal A1.

The pair of screw rods 8 and 9 are formed of ball screws, and the crosshead 10 is connected to each of the screw rods 8 and 9 via nuts (not shown).

The load mechanism 12 includes worm reducers 16 and 17 respectively connected to a lower end of each of the screw rods 8 and 9, a servo motor 18 connected to each of the worm reducers 16 and 17, and a rotary encoder 20. The rotary encoder 20 is a sensor that measures a rotation of the servo motor 18 and outputs a rotation measurement signal A2 having a pulse number corresponding to the rotation amount of the servo motor 18 to the control unit 4.

The load mechanism 12 transmits the rotation of the servo motor 18 to the pair of screw rods 8 and 9 via the worm reducers 16 and 17, and the crosshead 10 moves up and down along the screw rods 8 and 9 by rotating the screw rods 8 and 9 in synchronization with each other.

The crosshead 10 is provided with an upper gripper 21 for gripping an upper end of the test piece TP, and the table 6 is provided with a lower gripper 22 for gripping a lower end of the test piece TP. At the time of the material test, the testing machine main body 2 applies the testing force F to the test piece TP by lifting the crosshead 10 under control of the control unit 4 in a state in which both ends of the test piece TP are gripped by the upper gripper 21 and the lower gripper 22.

The control unit 4 includes a control device 30, a display device 32, and a test program execution device 34.

The control device 30 is a device that mainly controls the testing machine main body 2, and is connected to the testing machine main body 2 so as to be capable of transmitting and receiving signals. The signals received from the testing machine main body 2 are the testing force measurement signal A1 output by the load cell 14, the rotation measurement signal A2 output by the rotary encoder 20, and appropriate signals required for control and testing.

The display device 32 is a device that displays various information based on a signal input from the control device 30, for example, the control device 30 causes the display device 32 to display a testing force measurement value Fd which is the measurement value of the testing force F applied to the test piece TP based on the testing force measurement signal A1 during the material test.

The test program execution device 34 is a device including a function of receiving a user operation such as a setting operation of various setting parameters such as a test condition of the material test and an execution instruction operation to output them to the control device 30, and a function of analyzing data of a testing force measurement value Fd. The test program execution device 34 of the embodiment includes a computer, and the computer includes a processor such as a CPU and an MPU, a memory device such as a ROM and a RAM, a storage device such as an HDD and an SSD, and an interface circuit for connecting the control device 30, various peripheral devices, and the like. The processor implements the various functions by executing a material test program, which is a computer program stored in the memory device or the storage device.

Next, the control device 30 of the embodiment will be further described.

As illustrated in FIG. 1, the control device 30 includes a signal input and output unit 40 and a control circuit unit 50.

The signal input and output unit 40 configures an input and output interface circuit that transmits and receives a signal to and from the testing machine main body 2. In the embodiment, the signal input and output unit 40 includes a sensor amplifier 42, a counter circuit 43, and a servo amplifier 44.

The sensor amplifier 42 is an amplifier that amplifies the testing force measurement signal A1 output by the load cell 14 and inputs the amplified testing force measurement signal A1 to the control circuit unit 50.

The counter circuit 43 counts the pulse number of the rotation measurement signal A2 output by the rotary encoder 20, and outputs the rotation amount of the servo motor 18, that is, a displacement measurement signal A3 indicating a displacement amount x of the crosshead 10 moving up and down according to the rotation of the servo motor 18 to the control circuit unit 50 as a digital signal. During the execution of the material test, the displacement amount x indicates a displacement generated in the test piece TP. The testing machine main body 2 may include a physical quantity measurement device such as a displacement sensor that measures a displacement generated in the test piece TP when the testing force F is applied.

The servo amplifier 44 is a device that controls the servo motor 18 under control of the control circuit unit 50.

Figure 2:
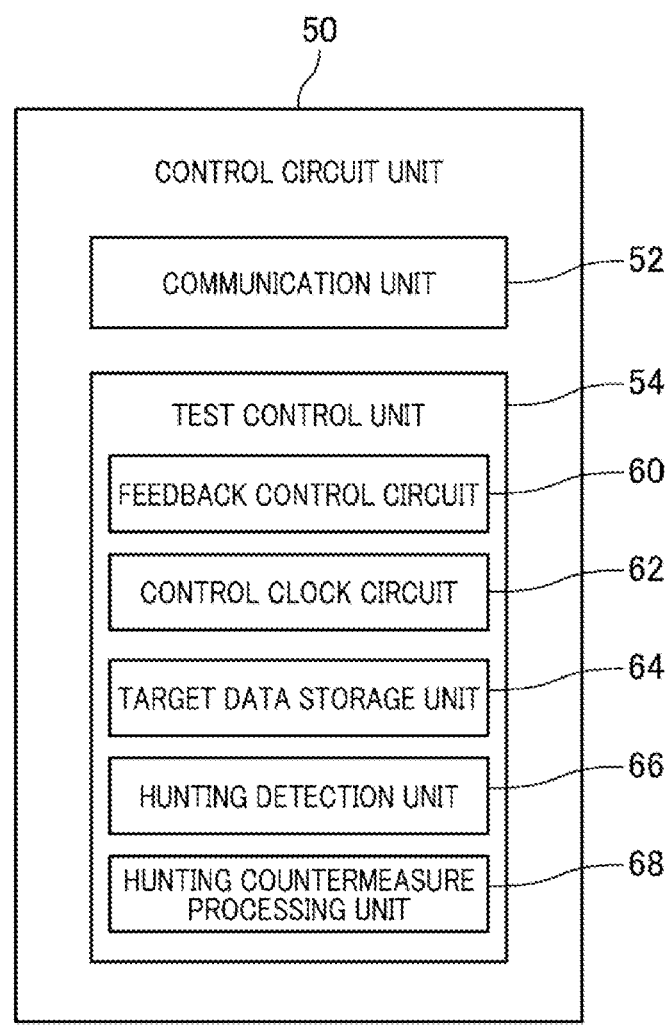
FIG. 2 is a block diagram illustrating a functional configuration of a control circuit unit.

FIG. 2 is a block diagram illustrating a functional configuration of the control circuit unit 50.

The control circuit unit 50 includes a communication unit 52 and a test control unit 54.

The control circuit unit 50 includes a computer including a processor such as a CPU and an MPU, a memory device such as a ROM and a RAM, a storage device such as an HDD and an SSD, an interface circuit of the signal input and output unit 40, a communication device communicating with the test program execution device 34, a display control circuit controlling the display device 32, and various electronic circuits, and the processor executes a computer program stored in the memory device or the storage device to implement each functional unit illustrated in FIG. 2. An A/D converter is provided in the interface circuit of the signal input and output unit 40, and the testing force measurement signal A1, which is an analog signal, is converted into a digital signal by the A/D converter.

The control circuit unit 50 is not limited to the computer, and may be configured of one or more appropriate circuits such as an integrated circuit such as an IC chip or an LSI.

The communication unit 52 communicates with the test program execution device 34, and receives, from the test program execution device 34, a test condition setting or set values of various setting parameters, and an execution instruction or an interruption instruction of the material test. The communication unit 52 transmits the testing force measurement value Fd based on the testing force measurement signal A1 to the test program execution device 34 at an appropriate timing.

The test control unit 54 feedback-controls the servo motor 18 of the testing machine main body 2 to execute the material test, and includes a feedback control circuit 60, a control clock circuit 62, a target data storage unit 64, and a hunting detection unit 66, and a hunting countermeasure processing unit 68.

The feedback control circuit 60 is a circuit that executes the feedback control of the servo motor 18. That is, the feedback control circuit 60 calculates a command value dx of the displacement amount x so that the testing force measurement value Fd matches a testing force target value Ft based on a deviation between the testing force measurement value Fd and a testing force target value Ft which is a target value of the testing force F, and outputs a command signal B1 indicating the command value dx (FIG. 1) to the servo amplifier 44. In the embodiment, a proportional-integral-differential (PID) control is used for the feedback control, and the feedback control circuit 60 includes a so-called PID controller. In the calculation of the command value dx, an appropriate control rule determined based on elasticity of the material (relationship between the displacement amount x and the testing force F) is used.

The feedback control circuit 60 has a dither signal addition function of adding a high frequency dither signal (high frequency small amplitude signal) to the command signal B1 as a signal noise countermeasure, and the command signal B1 is output to the servo amplifier 44.

The control clock circuit 62 is a clock circuit that outputs a timing signal that specifies a control cycle in the feedback control, and the feedback control circuit 60 executes a feedback control in synchronization with the timing signal of the control clock circuit 62. The timing signal only specifies the control cycle, and at least the hunting detection unit 66 and the hunting countermeasure processing unit 68 operate faster than the control cycle in synchronization with a clock signal faster than the timing signal.

The target data storage unit 64 includes a memory device that stores target data in advance. The target data is time-series data indicating a temporal change of the testing force target value Ft (relationship between the testing force target value Ft and the time) in the material test, and corresponds to a control waveform in the feedback control. The target data is changed and stored by the control circuit unit 50 according to a user setting operation for the test program execution device 34. Accordingly, in the material test, the testing force F is applied to the test piece TP according to the temporal change of the target data set by the user.

The hunting detection unit 66 detects hunting during the material test, and outputs the detection result to the hunting countermeasure processing unit 68 when the hunting is detected. The hunting detection unit 66 of the embodiment detects hunting by comparing frequency spectrum of the testing force target value Ft with frequency spectrum of the testing force measurement value Fd.

When the hunting is detected by the hunting detection unit 66, the hunting countermeasure processing unit 68 executes the hunting countermeasure processing for suppressing the hunting. By suppressing the hunting, it is possible to prevent a decrease in accuracy of the material test, and implement a high-quality test.

Hereinafter, as the operation of the embodiment, the operation of detecting occurrence of the hunting will be described.

Figure 3:
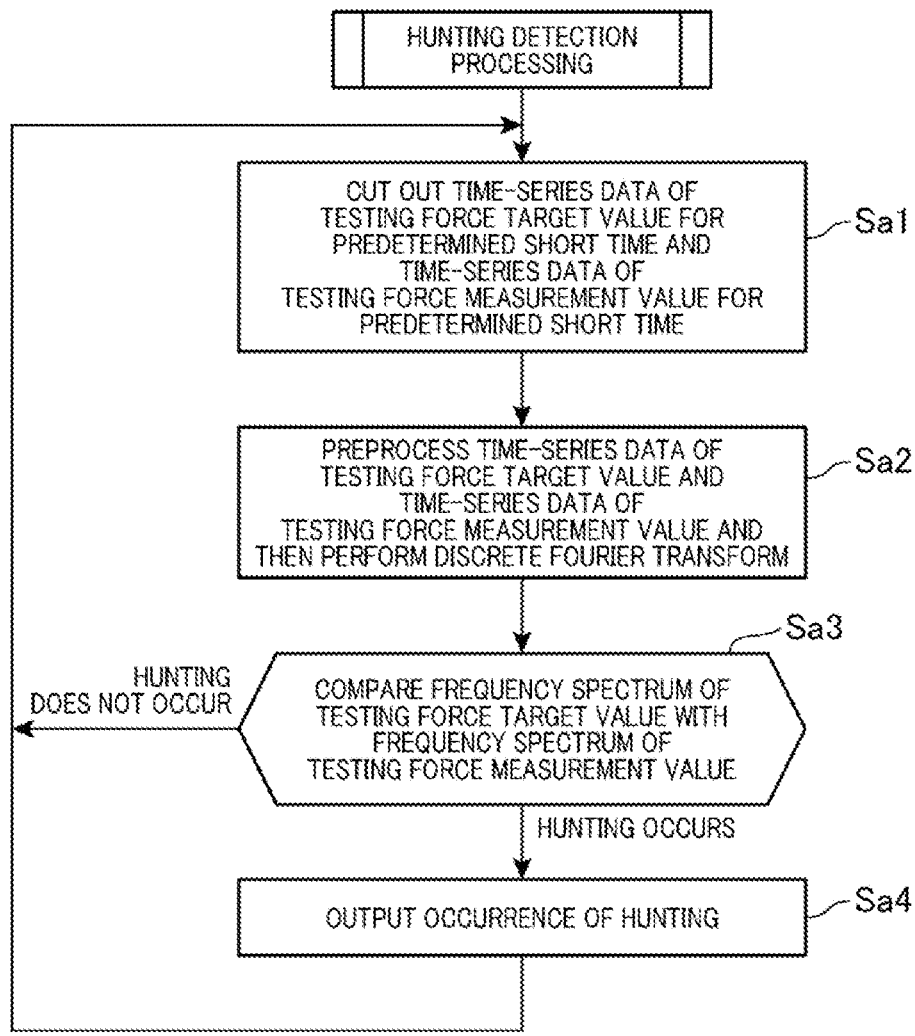
FIG. 3 is a flowchart of a hunting detection processing.

FIG. 3 is a flowchart of the hunting detection processing.

The hunting detection processing is continuously and repeatedly performed by the hunting detection unit 66 in order to promptly detect the occurrence of the hunting during the material test (at least while the feedback control of the testing force F is performed). When the material test is started, for example, time-series data of the testing force target value Ft (that is, control waveform in the feedback control) and time-series data of the testing force measurement value Fd (response waveform in the feedback control) are sequentially buffered in the memory device such as a RAM, which is provided in the hunting detection unit 66.

As illustrated in FIG. 3, first, the hunting detection unit 66 cuts out time-series data for a predetermined short time T of both the testing force target value Ft and the testing force measurement value Fd from the buffered data (Step Sa1). In the embodiment, the predetermined short time T is set to 1 of the control clock of the control clock circuit 62, but this will be described later.

Next, the hunting detection unit 66 preprocesses the time-series data of each of the testing force target value Ft and the testing force measurement value Fd, and then performs a discrete Fourier transform to obtain a frequency spectrum of the time-series data for a predetermined short time T (Step Sa2). Then, the hunting detection unit 66 compares the frequency spectrum of the testing force target value Ft with the frequency spectrum of the testing force measurement value Fd, and determines whether or not the hunting exists based on the comparison result (Step Sa3). Then, when the hunting occurs (Step Sa3: hunting exists), the hunting detection unit 66 outputs the result to the hunting countermeasure processing unit 68 (Step Sa4).

The preprocessing in Step Sa2 is processing of adjusting the time-series data for the predetermined short time T so that when time-series data is linked to the same time-series data successively to be expanded periodically, a waveform in which discontinuity at the linked part is suppressed is formed. In the preprocessing, window function processing or three-dimensional curve approximation correction processing is used.

The window function processing is processing of adjusting the time-series data by multiplying the time-series data for a predetermined short time T, which is a discrete Fourier transform target, by the window function, and an appropriate window function such as a Hamming window or a Hanning window, and a Blackman-Harris window can be used as the window function.

The three-dimensional curve approximation correction is processing disclosed in Japanese Patent Application No. 2017-243754, and the time-series data for a predetermined short time T, which is a discrete Fourier transform target, is adjusted by using a reference function instead of the window function.

The reference function is a function in which an inclination of a tangent in contact with a start point of time-series data for a predetermined short time T matches an inclination of an approximate straight line in vicinity of a start position of the time-series data, and an inclination of a tangent in contact with an end point of the time-series data matches an inclination of an approximate straight line in vicinity of an end position.

Then, subtraction of the reference function from the time-series data for a predetermined short time T is performed and the time-series data is adjusted to data in which opposite ends of the waveform of the time-series data smoothly converges to zero.

A polynomial function of degree three or higher is preferably used as the reference function, for example, a cubic curve (y) of the following Equation (1) having coefficients a, b, c, and d of the following Equation (2) can be used.

In Equations (1) and (2), a start position of time-series data for a predetermined short time T on a time axis is t1, a value is y1, an inclination of an approximate straight line in vicinity of the start position which is a tangent in contact with a start point (t1, y1) is k1, an end position of the time-series data for a predetermined short time T on the time axis is tend, a value is yend, and an inclination of an approximate straight line in vicinity of the end position which is a tangent in contact with an end point (tend, yend) is kend.

[Math. 1]

$$y(x) = a(x - t_1)^3 + b(x - t_1)^2 + c(x - t_1) + d \quad (1)$$

[Math. 2]

$$a = \frac{-2y_{end} + 2y_1 + (k_{end} + k_1)t_{end} + (-k_{end} - k_1)t_1}{t_{end}^3 - 3t_1 t_{end}^2 + 3t_1^2 t_{end} - t_1^3}$$
$$b = \frac{-3y_{end} + 3y_1 + (k_{end} + 2k_1)t_{end} + (-k_{end} - 2k_1)t_1}{t_{end}^2 - 2t_1 t_{end} + t_1^2}$$
$$c = k_1$$
$$d = y_1$$
(2)

In Step Sa3 of the hunting detection processing, the hunting detection unit 66 determines that the hunting occurs by comparing the frequency spectrum of the testing force target value Ft with the frequency spectrum of the testing force measurement value Fd as below. That is, the hunting detection unit 66 determines that the hunting occurs when an amplitude cumulative value of an amplitude in the frequency spectrum of the testing force measurement value Fd (hereinafter, referred to as a "measurement value amplitude cumulative value," and reference sign Dd is given) is a predetermined value Gth or more, compared with an amplitude cumulative value of an amplitude in the frequency spectrum of the testing force target value Ft (hereinafter, referred to as a "target value amplitude cumulative value," and reference sign Dt is given).

In Step Sa3, the hunting detection unit 66 compares a measurement value amplitude cumulative value Dd and a target value amplitude cumulative value Dt after removing a noise component generated in a feedback control system and a noise component generated in a measurement system that measures the testing force F and the displacement amount x (for example, measurement system including the load cell 14) from the frequency spectrum of the testing force measurement value Fd.

The hunting detection processing will be further described with reference to specific examples of the waveforms of the testing force measurement value Fd and the testing force target value Ft.

[Case in which Testing Force Target Value Ft Changes Monotonically on Time Axis (Case of Non-Vibration)]

Figure 4:
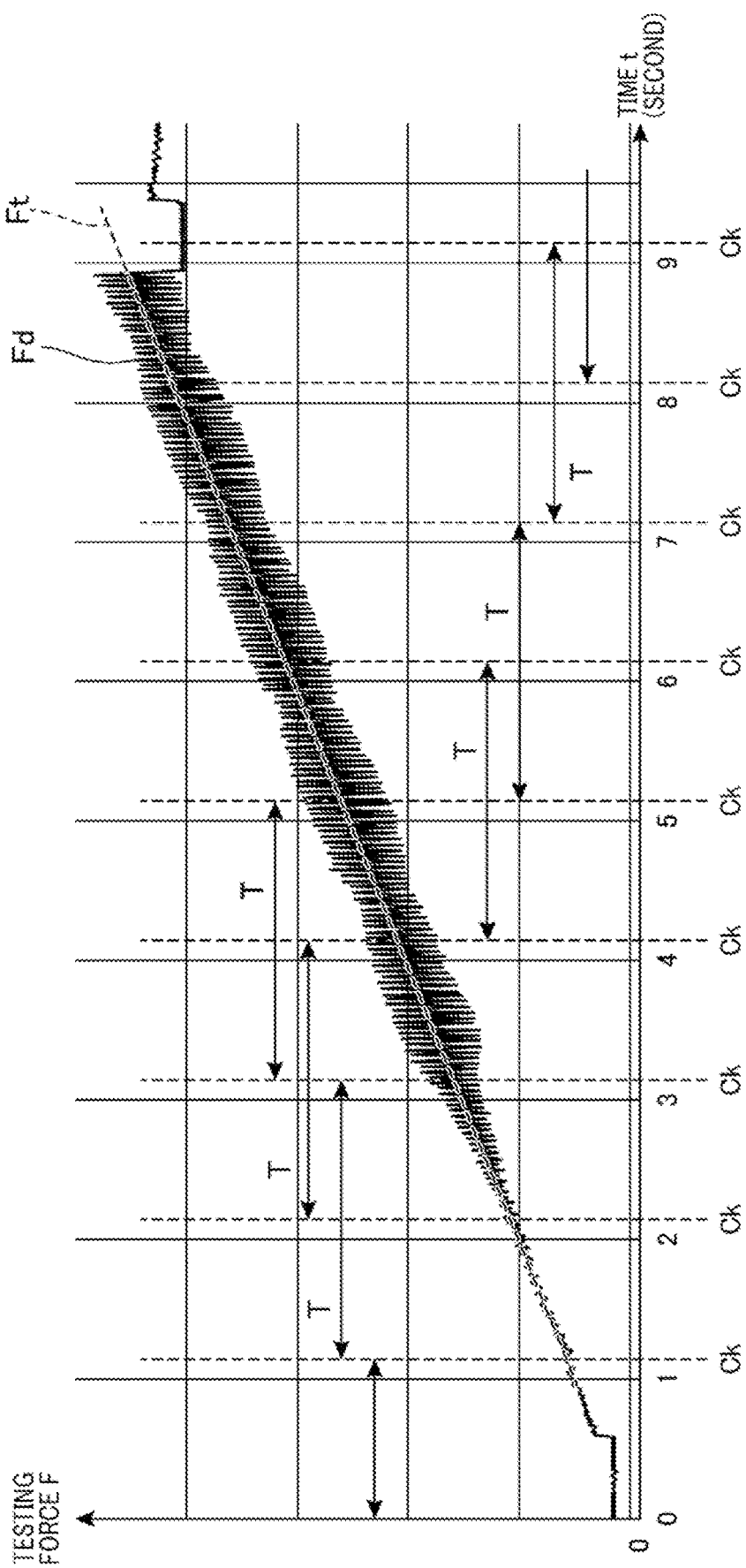
FIG. 4 is a graph illustrating an example of a time-axis waveform of a testing force target value and a testing force measurement value.

FIG. 4 is a graph illustrating an example of a time-axis waveform of the testing force target value Ft and the testing force measurement value Fd.

For example, in a tensile test, which is one form of the material test, as illustrated in a drawing, feedback control is performed so that the testing force target value Ft monotonically increases with a predetermined inclination on a time axis from a time when the test is started (t=0) (that is, testing force target value Ft does not include a vibration component on the time axis).

As in the illustrated example, the testing force measurement value Fd increases in accordance with the testing force target value Ft, and when the hunting starts to occur about two seconds after the start of the test, the hunting is detected by the hunting detection processing.

In the hunting detection processing, as described above, a series of processing of cutting out the time-series data for a predetermined short time T of each of the testing force target value Ft and the testing force measurement value Fd (Step Sa1), preprocessing on each time-series data and a discrete Fourier transform (Step Sa2), and determining whether or not the hunting occurs by comparing the frequency spectrum of the testing force target value Ft and the frequency spectrum of the testing force measurement value Fd (Step Sa3) is performed.

In the example, as illustrated in FIG. 4, the hunting detection processing is executed at each timing Ck when one second elapses from to immediately after the start of the test, and in Step Sa1 of each hunting detection processing, time-series data for two seconds as a predetermined short time T is cut out. In the following Step Sa2, the above-mentioned preprocessing is performed on the time-series data of the testing force measurement value Fd and the testing force target value Ft.

Figure 5:
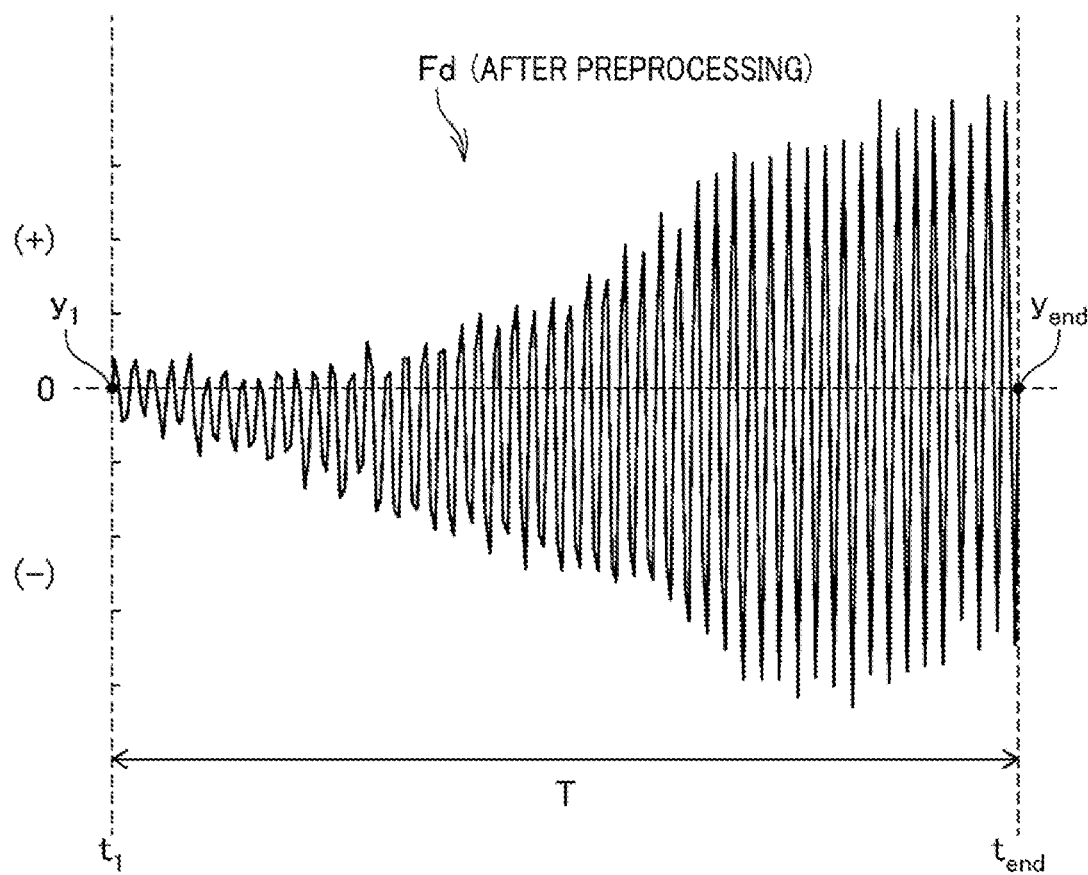
FIG. 5 is a graph illustrating time-series data after preprocessing the time-series data of a testing force measurement value by using three-dimensional curve approximation correction.

FIG. 5 is a graph illustrating time-series data obtained after time-series data of the testing force measurement value Fd cut out in a point of time tb (=about two seconds) when the hunting occurs is preprocessed by using the three-dimensional curve approximation correction.

As illustrated in the drawing, by performing the preprocessing, the time-series data is adjusted to data in which an amplitude value (measurement value Fd) smoothly converges to zero at a start point t1 and an end point tend of a waveform.

After the preprocessing, in Step Sa2, a frequency spectrum of each of the testing force measurement value Fd and the testing force target value Ft is obtained by performing the discrete Fourier transform on time-series data of each of the testing force measurement value Fd and the testing force target value Ft.

Figure 6:
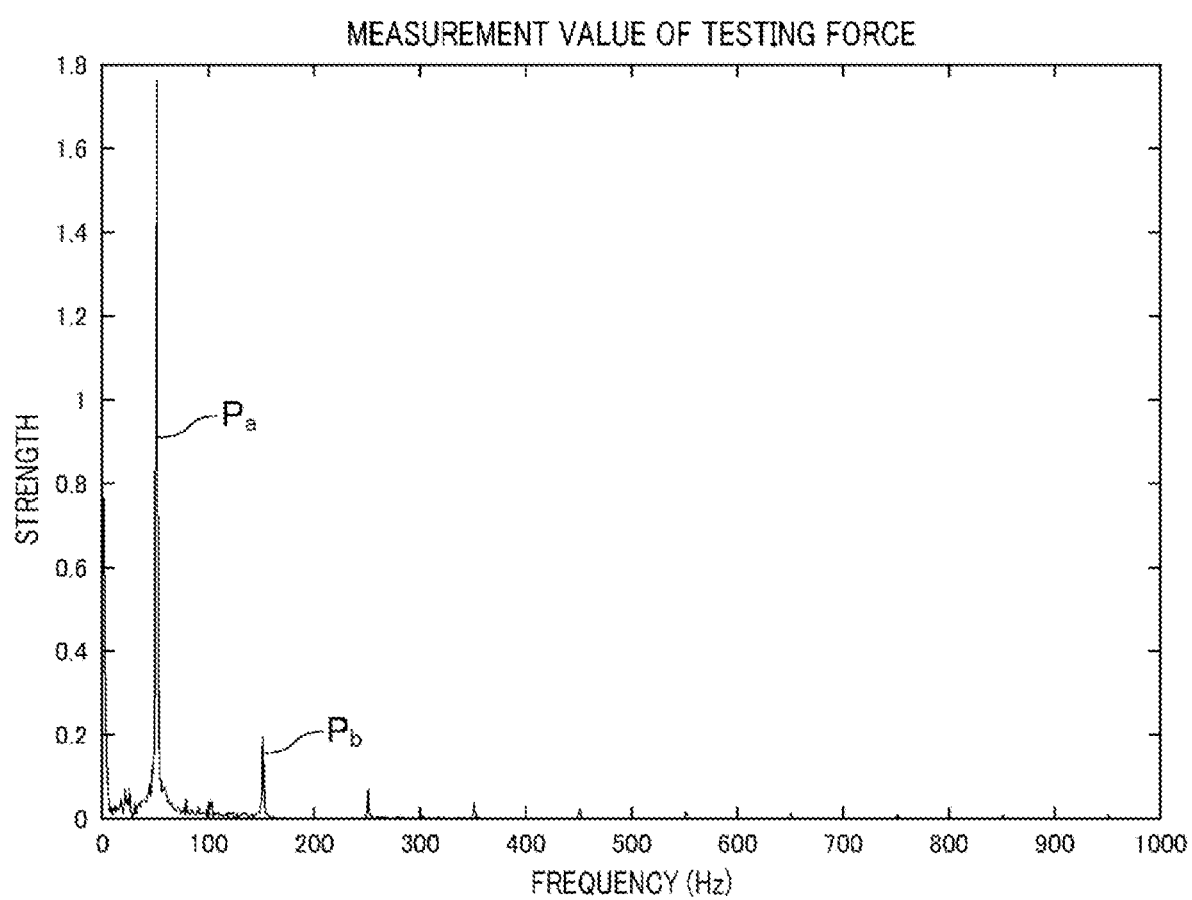
FIG. 6 is a graph illustrating a frequency spectrum of a testing force measurement value.

FIG. 6 is a graph illustrating the frequency spectrum of the testing force measurement value Fd.

In the case of the example, since a time-axis waveform (time-series data) of the testing force target value Ft does not include a vibration component, the frequency spectrum does not include a relatively excessively strong peak even when the time-series data is cut out at any predetermined short time T. Therefore, when the hunting does not occur, the frequency spectrum of the testing force measurement value Fd does not include a relatively excessively strong peak. In other words, as illustrated in FIG. 6, when relatively excessively strong peaks Pa and Pb are generated in the frequency spectrum of the testing force measurement value Fd, it can be said that the peaks Pa and Pb are generated by the hunting.

Therefore, in the case of the example, it can be determined whether or not the hunting occurs based on whether or not the excessively strong peak which is not included in the frequency spectrum of the testing force target value Ft is included in the frequency spectrum of the testing force measurement value Fd. Whether or not the excessively strong peak is included in the frequency spectrum of the testing force measurement value Fd can be determined based on whether or not the measurement value amplitude cumulative value Dd is a predetermined value Gth or more. For example, the predetermined value Gth is set based on a value obtained by adding a margin to the target value amplitude cumulative value Dt.

From the above, in Step Sa3, it is determined whether or not the measurement value amplitude cumulative value Dd is a predetermined value Gth or more, and when the measurement value amplitude cumulative value Dd is the predetermined value Gth or more (Step Sa3: hunting exists), a fact that hunting occurs is output. In the determination, since the predetermined value Gth is set based on the target value amplitude cumulative value Dt, the measurement value amplitude cumulative value Dd is substantially compared with the target value amplitude cumulative value Dt.

Figure 7:
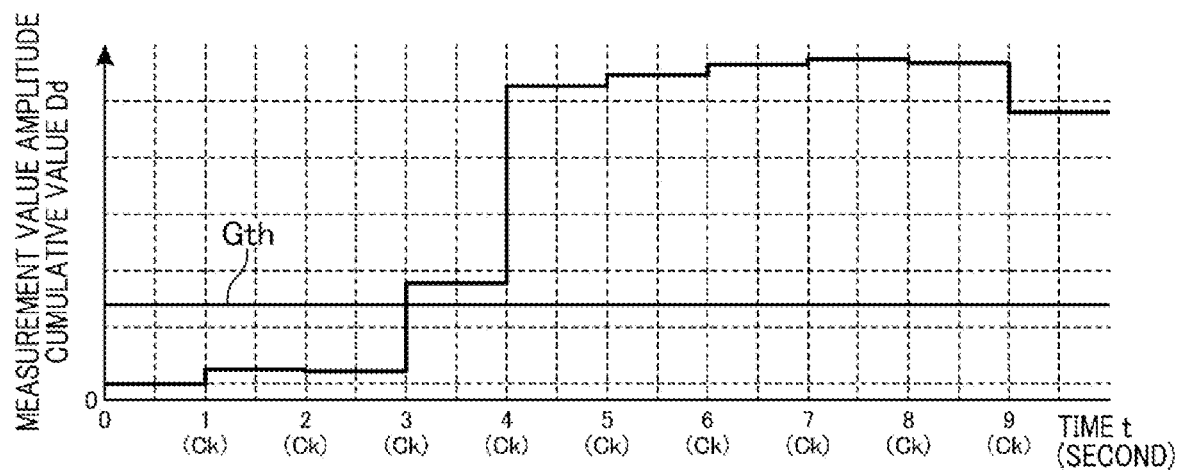
FIG. 7 is a graph illustrating a temporal change in a measurement value amplitude cumulative value.

FIG. 7 is a graph illustrating a temporal change in the measurement value amplitude cumulative value Dd.

In the example, the hunting detection processing is executed at each timing Ck when one second elapses immediately after the start of the test, and in each hunting detection processing, the measurement value amplitude cumulative value Dd is calculated for the testing force measurement value Fd over the latest predetermined short time T (two seconds in the example).

In the example, since the hunting starts to occur from a time point when about two seconds elapse from the start of the test, as illustrated in FIG. 7, the measurement value amplitude cumulative value Dd exceeds the predetermined value Gth at a time point of about three seconds, which is a timing Ck of the hunting detection processing immediately after the hunting starts to occur. Accordingly, the occurrence of the hunting in a scale in which the measurement value amplitude cumulative value Dd exceeds the predetermined value Gth is detected accurately and promptly.

[Case in which Testing Force Target Value Ft Changes on Time Axis (Case of Vibration)]

Figure 8:
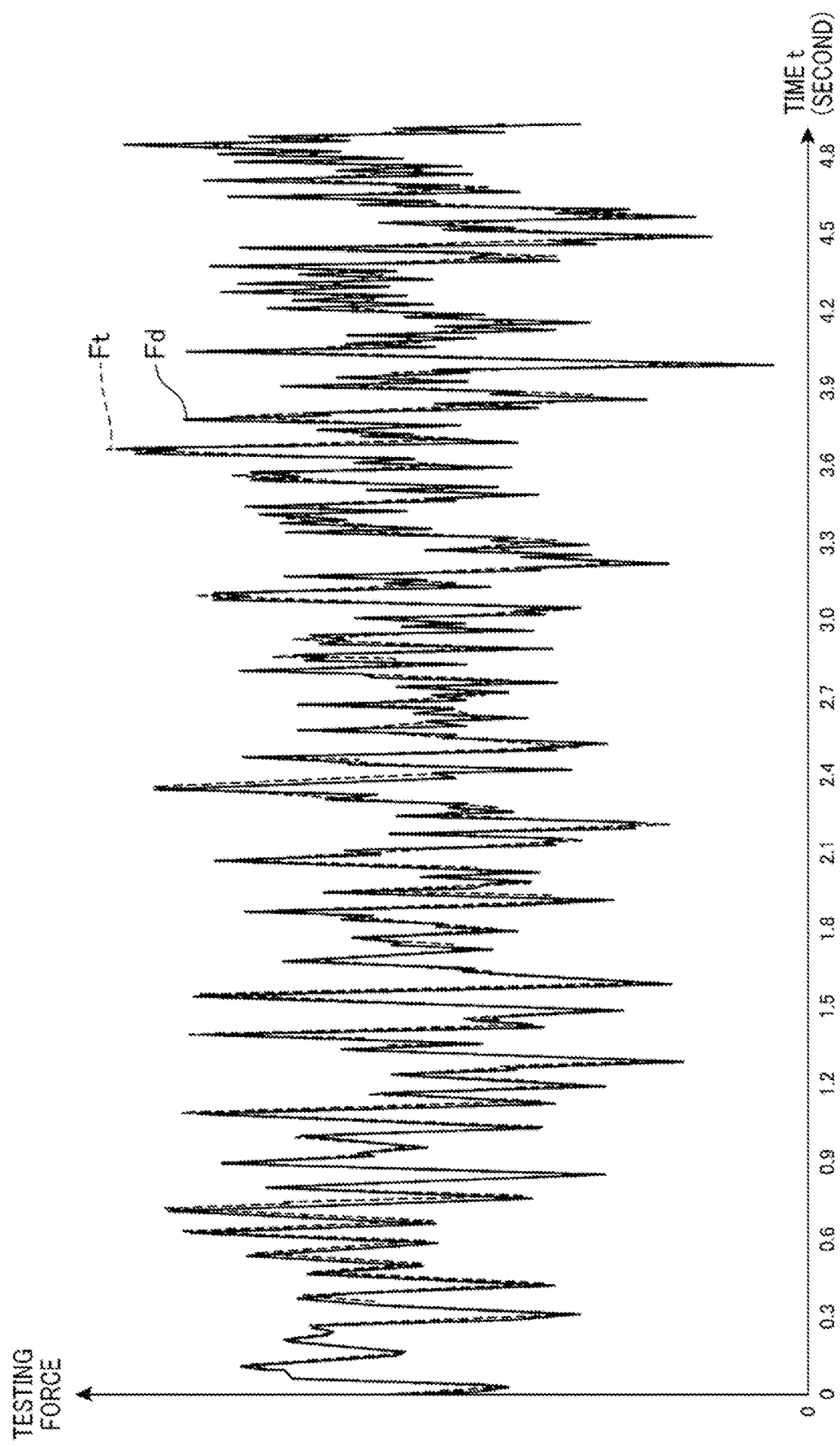
FIG. 8 is a graph illustrating another example of a time-axis waveform of a testing force target value and a testing force measurement value.

FIG. 8 is a graph illustrating another example of the time-axis waveform of the testing force target value Ft and the testing force measurement value Fd.

For example, in the fatigue test which is one form of the material test, the testing force target value Ft changes from moment to moment on the time axis.

In the example, the testing force target value Ft vibrates in a plurality of frequency components on the time axis from a time when the test is started (t=0), and according to this, the testing force measurement value Fd also vibrates complicatedly on the time axis. As is clear from FIG. 8, it is difficult to distinguish the hunting from the amplitude (fluctuation) of the testing force measurement value Fd on the time axis. When the testing force target value Ft vibrates, the frequency components of the vibration appear in the frequency spectrum of the testing force measurement value Fd. Therefore, it is difficult to accurately determine the hunting only by using the frequency spectrum of the testing force measurement value Fd.

On the other hand, in the hunting detection processing of the embodiment, the occurrence of the hunting is not determined only by using the testing force measurement value Fd, but determined by comparing the frequency spectrum of the testing force measurement value Fd with the frequency spectrum of the testing force target value Ft (Step Sa3). Therefore, the hunting can be detected accurately. Specifically, in Step Sa3, the measurement value amplitude cumulative value Dd and the target value amplitude cumulative value Dt are calculated based on the frequency spectrum of the testing force measurement value Fd and the frequency spectrum of the testing force target value Ft, and when a difference E obtained by subtracting the target value amplitude cumulative value Dt from the measurement value amplitude cumulative value Dd is the predetermined value Gth or more, it is determined that the hunting occurs.

Figure 9:
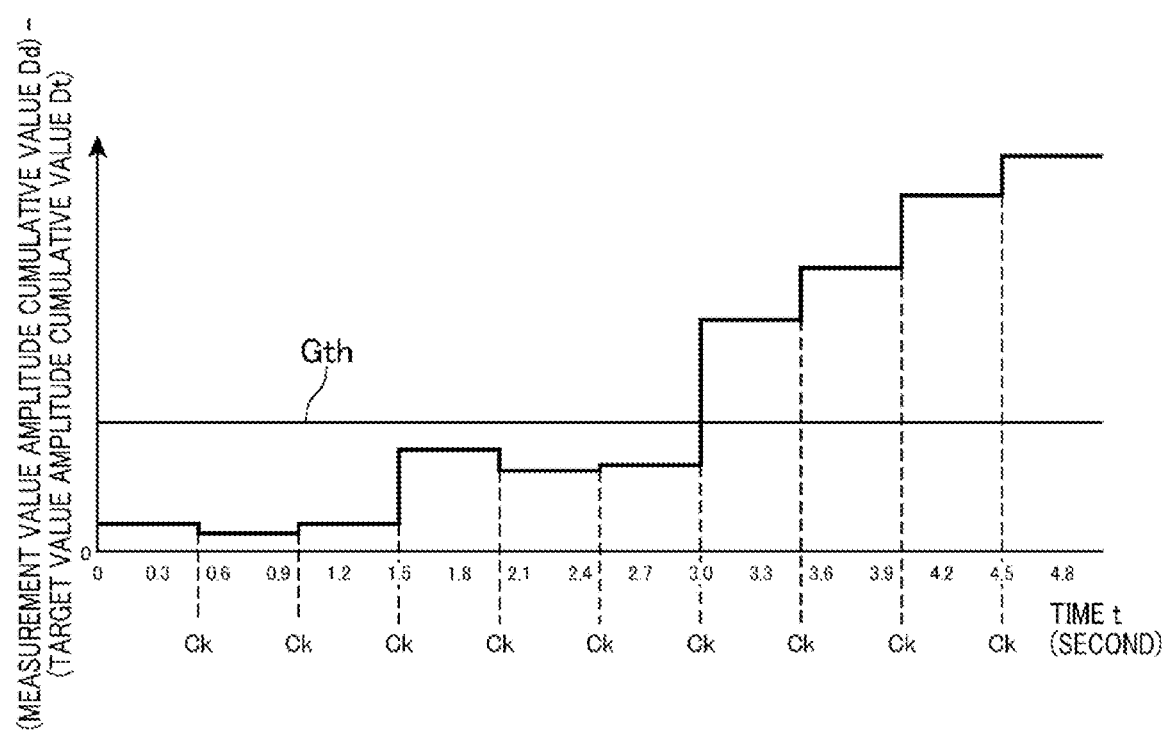
FIG. 9 is a graph illustrating a temporal change in a difference between a testing force measurement value and a testing force target value.

FIG. 9 is a graph illustrating a temporal change in the difference E between the testing force measurement value Fd and the testing force target value Ft.

In the example, the hunting detection processing is executed at each timing Ck when 0.5 seconds elapse immediately after the start of the test, and in each hunting detection processing, the difference E between the measurement value amplitude cumulative value Dd and the target value amplitude cumulative value Dt is calculated based on the testing force measurement value Fd and the testing force target value Ft over the latest predetermined short time T (one second in the example).

In the example, as illustrated in FIG. 9, a value of the difference E exceeds the predetermined value Gth and greatly increases in a time point of three seconds after the start of the test. According to this, in this time point, the occurrence of the hunting in a scale in which the difference E exceeds the predetermined value Gth is detected accurately and promptly.

Here, in the case of a waveform in which the testing force target value Ft vibrates complicatedly on the time axis, when the predetermined short time T in which the time-series data of the testing force target value Ft is cut out is longer, more frequency components are included in the time-series data after cutting out the time-series data. Therefore, the target value amplitude cumulative value Dt also tends to increase. As a result, even when the hunting occurs, the difference E between the measurement value amplitude cumulative value Dd and the target value amplitude cumulative value Dt is difficult to increase, accuracy of hunting detection decreases, and a detection timing of the hunting is delayed.

For this reason, the shorter the predetermined short time T, the more preferable. Therefore, in the embodiment, as described above, by setting the predetermined short time T to one cycle of a clock signal of the control clock circuit 62, the predetermined short time T is set as a minimum cycle of a feedback control cycle, and the accuracy of hunting detection and the detection speed are improved.

Needless to say, the predetermined short time T may be set to a longer time (for example, a plurality cycles of a feedback control cycle) within a range in which a reasonable detection accuracy and detection speed are obtained.

By the way, various noises caused by a sensor or a digital signal processing are included in the feedback control system and the measurement system that measures the testing force F and the displacement amount x. In the embodiment, in Step Sa3, when the hunting detection unit 66 compares the frequency spectrum of the testing force measurement value Fd with the frequency spectrum of the testing force target value Ft, the accuracy of hunting detection is improved since the comparison is performed in a state in which the noise of the feedback control system and the noise of the measurement system are removed from the frequency spectrum of the testing force measurement value Fd.

Specifically, in the embodiment, for example, the test control unit 54 stores data of frequency spectrum of measurement noise obtained by measuring noise included in the feedback control system and the measurement system in advance, in the memory device or the like. Then, when the measurement value amplitude cumulative value Dd is calculated for the testing force measurement value Fd, the hunting detection unit 66 removes the frequency spectrum of the noise from the frequency spectrum of the testing force measurement value Fd, and calculates the measurement value amplitude cumulative value Dd.

When the hunting is detected in the hunting detection processing, the hunting countermeasure processing unit 68 executes the hunting countermeasure processing.

Specifically, in the hunting countermeasure processing, the hunting countermeasure processing unit 68 appropriately changes a control gain (for example, proportional gain, integration gain, differential gain, and the like) (reduces a control gain in the present embodiment) in the PID control of the feedback control circuit 60 to suppress the hunting.

Figure 10:
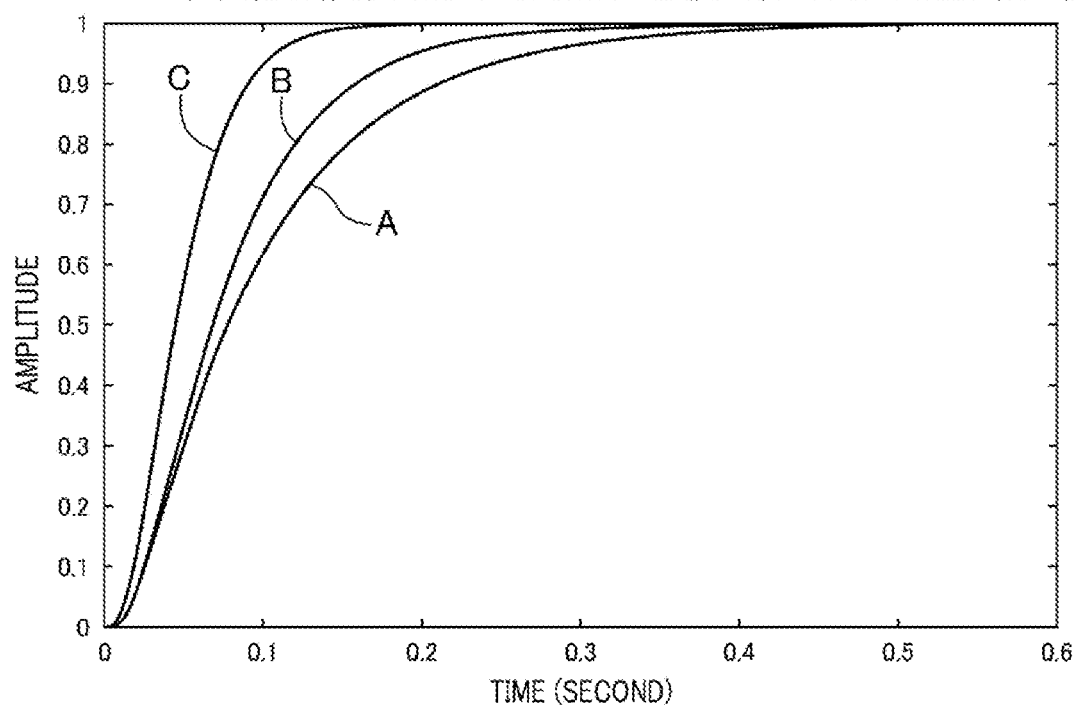
FIG. 10 is a graph illustrating a step response in general PI control.
Figure 11:
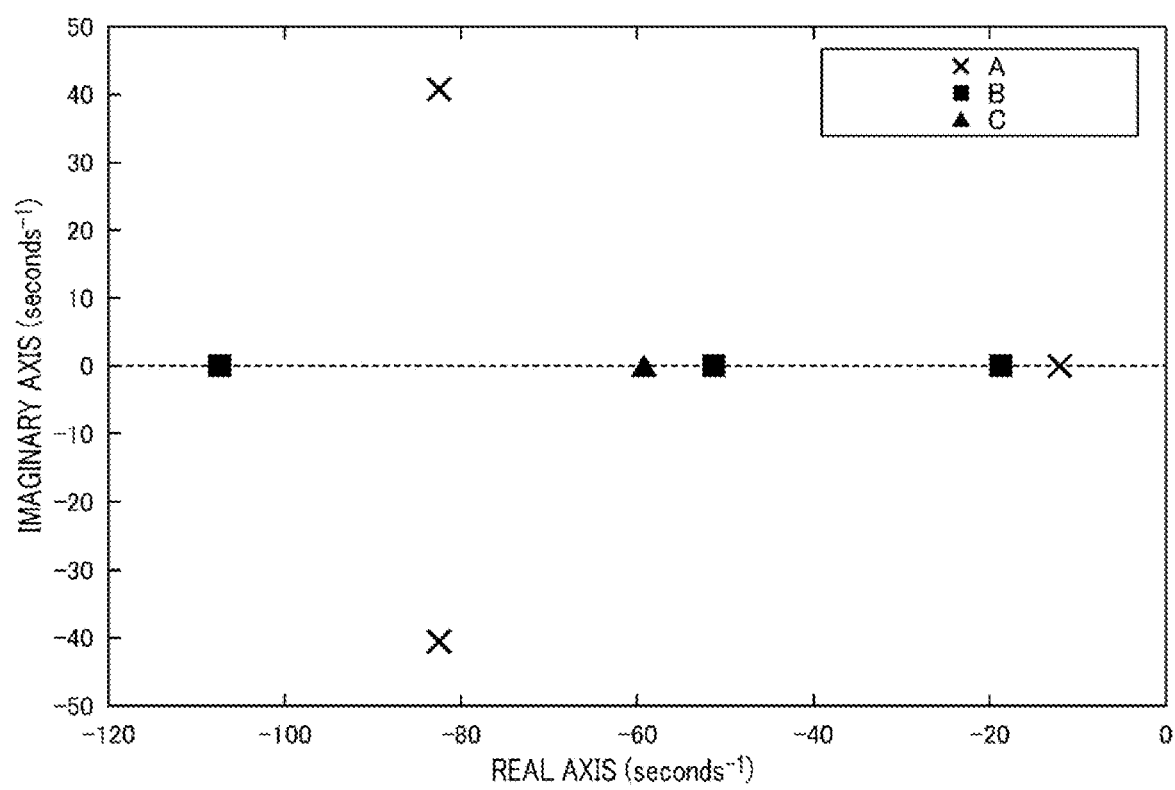
FIG. 11 is a pole-zero arrangement diagram for FIG. 10.

FIG. 10 illustrates a step response in the general PI control, and FIG. 11 is a pole-zero arrangement diagram for FIG. 10.

As illustrated in FIG. 10, when only the integration gain is reduced to a half value as the control gain, as illustrated in FIG. 11, an imaginary number solution appears in a pole arrangement and the control system vibrates, or the pole is disposed in a positive area and the control system diverges. Therefore, the control system becomes unstable. On the other hand, when the integration gain is reduced by half, a value of a proportional gain in which an imaginary number value is zero is obtained in the pole arrangement, and the proportional gain proportional to the value is also changed, whereby the control system can be prevented from being unstable.

When the hunting countermeasure processing unit 68 changes the control gain, if necessary, other adjustable control gains are appropriately changed, for example, based on the above-described pole arrangement so that the feedback control system does not become unstable.

Figure 12:
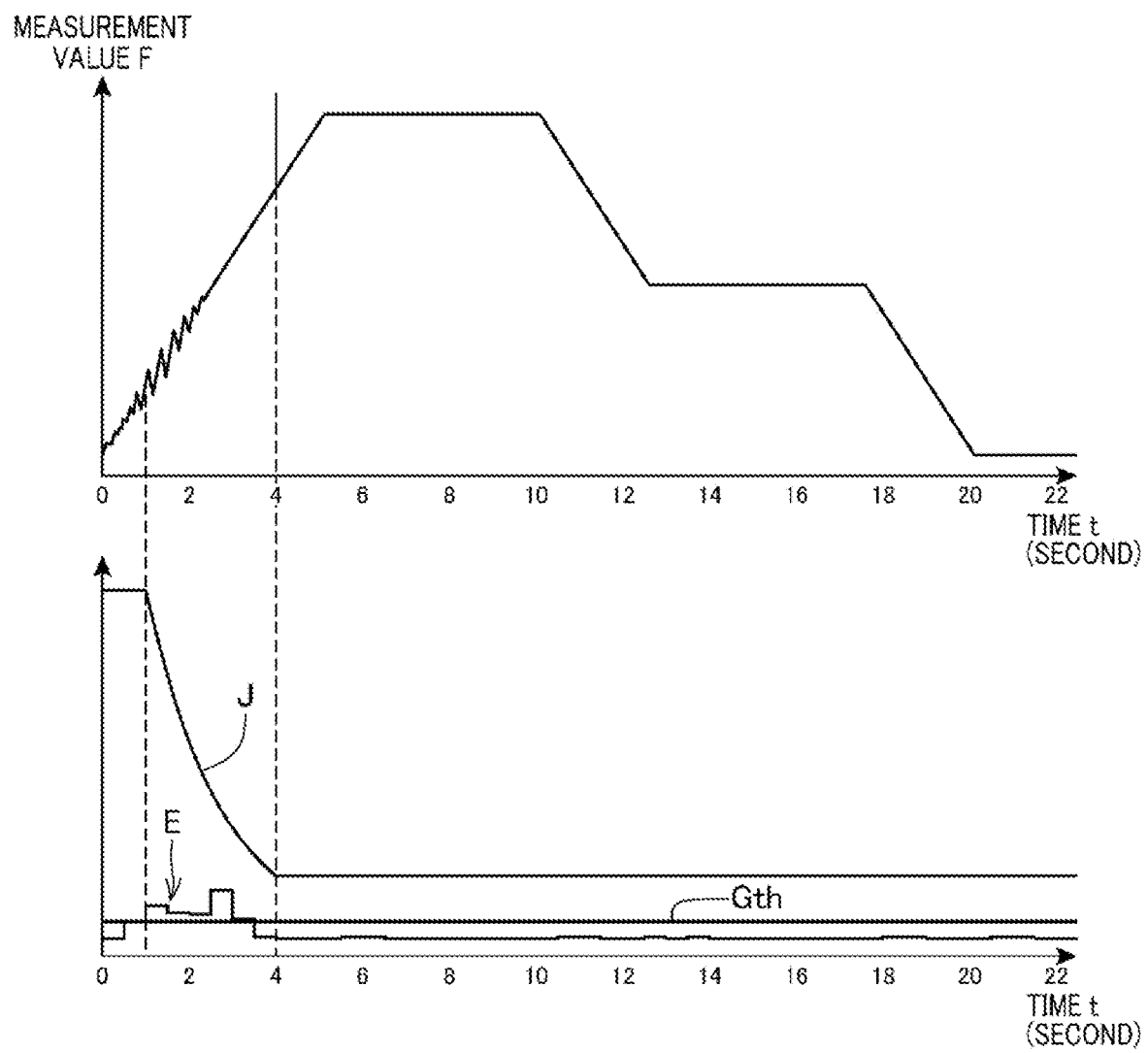
FIG. 12 is an operation explanatory graph of hunting countermeasure processing.

However, when the control gain is abruptly changed, an extreme discontinuity may occur in the command value dx (command signal B1). Here, as illustrated in FIG. 12, when the difference E between the measurement value amplitude cumulative value Dd and the target value amplitude cumulative value Dt exceeds the predetermined value Gth and the hunting is detected, the hunting countermeasure processing unit 68 calculates a value obtained by suppressing the hunting as a changed value of a control gain J, while maintaining stability of the control system. Then, the control gain J is gradually (that is, smoothly) changed to the change value as the lower limit until the difference E falls below the predetermined value Gth (until hunting is no longer detected).

In the embodiment, since a low-pass filter circuit is incorporated into a differentiator, the feedback control circuit 60 (PID controller) includes the filter circuit. Therefore, in addition to the above-described control gain, the hunting countermeasure processing unit 68 may appropriately change a filter strength of the low-pass filter circuit (increase a filter strength in the present embodiment) to suppress or eliminate a hunting phenomenon.

Without limiting the control gain and the filter strength, when parameters are control parameters that can be changed and the hunting phenomenon can be suppressed or eliminated by using the changed parameters, it is needless to say that the hunting countermeasure processing unit 68 may change the control parameters in the hunting countermeasure processing.

When the hunting continues to be detected even after the control parameters such as the control gain J, and the like are changed to a predetermined value or when the difference E significantly exceeds the predetermined value Gth to be large (that is, when hunting with significantly large amplitude occurs), the hunting countermeasure processing unit 68 may forcedly stop the material test and/or output warning to a user.

According to the embodiment, the following effects are obtained.

The material testing machine 1 of the embodiment detects the hunting by comparing frequency spectrum obtained by converting the time-series data of the testing force measurement value Fd corresponding to a response waveform of the feedback control with frequency spectrum obtained by converting the time-series data of the testing force target value Ft corresponding to the control waveform.

Accordingly, the hunting can be detected accurately even when the time-axis waveform of the testing force target value Ft changes.

Since the material testing machine 1 of the embodiment removes an influence of noise of the control system in the feedback control and compares the frequency spectrum of the testing force measurement value Fd with the frequency spectrum of the testing force target value Ft, accuracy of hunting detection can be improved.

Since the material testing machine 1 of the embodiment compares the frequency spectrum of the testing force measurement value Fd with the frequency spectrum of the testing force target value Ft in a state in which a frequency spectrum obtained by measuring noise of the control system in the feedback control is removed from the frequency spectrum of the testing force measurement value Fd, the influence of the noise of the control system can be reliably removed.

In the material testing machine 1 of the embodiment determines whether or not the hunting occurs based on whether or not the measurement value amplitude cumulative value Dd in the frequency spectrum of the testing force measurement value Fd is the predetermined value Gth or more compared with the target value amplitude cumulative value Dt in the frequency spectrum of the testing force target value Ft.

Accordingly, it is possible to detect that the hunting occurs in a scale in which the difference E between the measurement value amplitude cumulative value Dd and the target value amplitude cumulative value Dt is the predetermined value Gth or more.

In the material testing machine 1 of the embodiment, the frequency spectrum of the testing force measurement value Fd and the frequency spectrum of the testing force target value Ft are obtained by converting data for a predetermined short time T, which are cut out from time-series data of the testing force measurement value Fd and time-series data of the testing force target value Ft. The predetermined short time T is set based on a cycle of the feedback control cycle in the feedback control.

Accordingly, even when the time-axis waveform of the testing force target value Ft includes a vibration component, the predetermined short-time T is appropriately set between one cycle and a plurality of cycles of the feedback control cycle according to the vibration state. Therefore, the hunting can be detected with a reasonable detection accuracy and a detection speed.

When the hunting is detected, the material testing machine 1 of the embodiment changes the control parameters of the control system in the feedback control to suppress the hunting. Therefore, deterioration in accuracy of the material test can be prevented.

The above-described embodiment is merely an example of one aspect of the present invention, and can be arbitrarily modified and applied without departing from the spirit of the present invention.

In the above-described embodiment, the hunting detection unit 66 removes the influence of the noise by removing the frequency spectrum of the noise of the control system in the feedback control from the frequency spectrum of the testing force measurement value Fd, but the present invention is not limited to this.

Specifically, since a frequency of hunting is higher than a low frequency domain, it is not necessary to use the low frequency domain (for example, 1 Hz or less) without the frequency of the hunting for a hunting detection. Therefore, the hunting can be detected by comparing the frequency spectrum of the testing force measurement value Fd with the frequency spectrum of the testing force target value Ft in a frequency domain excluding the low frequency domain.

Accordingly, even when noise of the control system in the feedback control is not measured, the hunting can be detected without being affected by the noise in the low frequency domain.

When the waveform of the testing force target value Ft does not include the vibration component on the time axis, the hunting can be sufficiently detected only by comparing the frequency domains excluding a high frequency domain. Therefore, in this case, the hunting may be detected by comparing the frequency spectrum of the testing force measurement value Fd with the frequency spectrum of the testing force target value Ft in a high frequency domain including high frequency noise of the control system and the measurement system and a frequency domain excluding a frequency domain of the dither signal superimposed on the command signal B1.

Accordingly, the hunting can be detected without being affected by high frequency noise in the control system and the measurement system, and the dither signal.

In the above-described embodiment, when a predetermined frequency domain that is guaranteed not to include noise of the control system and the measurement system of the material testing machine 1 is known, the hunting detection unit 66 may compare the frequency spectrum of the testing force measurement value Fd with the frequency spectrum of the testing force target value Ft only within a range of a predetermined frequency domain.

Accordingly, the hunting can be easily detected without being affected by noise.

In the above-described embodiment, the hunting detection unit 66 converts each of the time-series data of the testing force measurement value Fd for the predetermined short time T and the time-series data of the testing force target value Ft for the predetermined short time T to a frequency spectrum every time. However, the hunting detection unit 66 may use a frequency spectrum of the testing force target value Ft calculated in advance.

In the above-described embodiment, the hunting detection unit 66 may determine whether or not the hunting occurs by comparing a power spectrum of the testing force measurement value Fd with a power spectrum of the testing force target value Ft.

In the above-described embodiment and each modification example, the hunting detection unit 66 compares the frequency spectrum of the testing force measurement value Fd with the frequency spectrum of the testing force target value Ft, but the present invention is not limited to this, and the hunting may be detected by comparing the frequency spectrum of the command signal B1 that is a control signal of the feedback control with the frequency spectrum of the testing force target value Ft. In this case, when the dither signal is superimposed on the command signal B1, the hunting detection unit 66 compares the frequency spectrum of the command signal B1 with the frequency spectrum of the testing force target value Ft without removing the dither signal from the command signal B1.

In the above-described embodiment, a driving source of the load mechanism 12 of the material testing machine 1 is not limited to the servo motor 18, and may be another power source such as a hydraulic pressure source.

In the above-described embodiment, a functional block illustrated in FIG. 2 is a schematic view showing constituent elements classified according to main processing contents in order to facilitate understanding of the present invention, and the functional block can be classified into more constituent elements according to the processing contents. One constituent element can also be classified so as to perform more processing.

The material testing machine 1 to which the present invention is applied can preferably be applied to a tensile testing machine in which a target value changes monotonically, a fatigue testing machine in which a target value changes from moment to moment (hydraulic fatigue testing machine or electromagnetic fatigue testing machine), and an endurance testing machine as well as a universal testing machine.

In the present invention, any material testing machine can be applied when the material testing machine includes a load mechanism that applies a load to a test object, a load measurement device that measures a load applied to the test object, and a control device that performs a feedback control for the load mechanism based on a deviation between a measurement value of the load and a target value of the load, in which a change in a physical quantity generated in the test object due to the load is measured by a physical quantity measurement device.

What is claimed is:

1. A material testing machine comprising:
   a load mechanism that applies a load to a test object;
   a load measurement device that measures the load applied to the test object; and
   a control device that performs a feedback control for the load mechanism based on a deviation between a measurement value of the load and a target value of the load,
   wherein a change in a physical quantity generated in the test object due to the load is measured, and
   the control device comprises a hunting detection unit that detects hunting by comparing a frequency spectrum obtained by converting time-series data of the measurement value with a frequency spectrum obtained by converting time-series data of the target value, or by comparing a frequency spectrum obtained by converting time-series data of a command value of the feedback control with the frequency spectrum obtained by converting the time-series data of the target value.

2. The material testing machine according to claim 1, wherein
   the hunting detection unit removes an influence of noise of a control system in the feedback control and/or noise of a measurement system measuring the load and the physical quantity from the measurement value and compares the frequency spectrum of the measurement value with the frequency spectrum of the target value, or removes an influence of noise of the control system in the feedback control from the command value of the feedback control and compares the frequency spectrum of the command value with the frequency spectrum of the target value.

3. The material testing machine according to claim 2, wherein
the hunting detection unit compares the frequency spectrum of the measurement value with the frequency spectrum of the target value in a state in which a frequency spectrum of noise obtained by measuring the noise of the control system in the feedback control and/or the noise of the measurement system measuring the load and the physical quantity is removed from the frequency spectrum of the measurement value, or
compares the frequency spectrum of the command value with the frequency spectrum of the target value in a state in which a frequency spectrum of noise obtained by measuring the noise of the control system in the feedback control is removed from the frequency spectrum of the command value of the feedback control.

4. The material testing machine according to claim 2, wherein
the hunting detection unit compares the frequency spectrum of the measurement value with the frequency spectrum of the target value, or the frequency spectrum of the command value of the feedback control with the frequency spectrum of the target value, in a frequency domain excluding a low frequency domain without a frequency of the hunting.

5. The material testing machine according to claim 2, wherein
the hunting detection unit compares the frequency spectrum of the measurement value with the frequency spectrum of the target value, or the frequency spectrum of the command value of the feedback control with the frequency spectrum of the target value, in a frequency domain excluding a high frequency domain including the noise of the control system in the feedback control.

6. The material testing machine according to claim 5, wherein
a dither signal is added to a command signal of the command value of the feedback control by the control system in the feedback control, and
the hunting detection unit performs the comparison in a frequency domain in which a high frequency domain including the dither signal is removed from the frequency spectrum of the measurement value when the frequency spectrum of the measurement value is compared with the frequency spectrum of the target value.

7. The material testing machine according to claim 5, wherein
the hunting detection unit compares the frequency spectrum of the measurement value with the frequency spectrum of the target value, or the frequency spectrum of the command value of the feedback control with the frequency spectrum of the target value, in a predetermined frequency domain that is guaranteed not to include the noise.

8. The material testing machine according to claim 1, wherein
the hunting detection unit determines whether or not the hunting occurs based on whether or not a cumulative value of an amplitude in the frequency spectrum of the measurement value or the frequency spectrum of the command value is a predetermined value or more, compared with a cumulative value of an amplitude in the frequency spectrum of the target value.

9. The material testing machine according to claim 1, wherein
the frequency spectrum of the measurement value or the command value, and the frequency spectrum of the target value are obtained by converting data for a predetermined time, which are cut out from the time-series data of the measurement value or the command value, and the time-series data of the target value, and
the predetermined time is set based on a cycle of a feedback control cycle in the feedback control.

10. The material testing machine according to claim 1, further comprising
a hunting countermeasure processing unit that suppresses the hunting by changing a control parameter of a control system in the feedback control when the hunting is detected.

11. A method of controlling a material testing machine comprising:
a load mechanism that applies a load to a test object;
a load measurement device that measures the load applied to the test object; and
a control device that performs a feedback control for the load mechanism based on a deviation between a measurement value of the load and a target value of the load,
the material testing machine measuring a change in a physical quantity generated in the test object due to the load,
the method comprising causing the control device to detect hunting by comparing a frequency spectrum obtained by converting time-series data of the measurement value with a frequency spectrum obtained by converting time-series data of the target value, or by comparing a frequency spectrum obtained by converting time-series data of a command value of the feedback control with the frequency spectrum obtained by converting the time-series data of the target value.

* * * * *